United States Patent
Stewart et al.

(10) Patent No.: US 8,539,577 B1
(45) Date of Patent: Sep. 17, 2013

(54) SYSTEM AND METHOD FOR FAST FLUX DETECTION

(75) Inventors: David Alexander Stewart, Vienna, VA (US); Ben Mankin, London (GB); Antony Arthur Riley, Espoo (FI)

(73) Assignee: Verisign, Inc., Mountain View, CA (US)

( * ) Notice: Subject to any disclaimer, the term of this patent is extended or adjusted under 35 U.S.C. 154(b) by 1237 days.

(21) Appl. No.: 12/393,913

(22) Filed: Feb. 26, 2009

Related U.S. Application Data (60) Provisional application No. 61/074,588, filed on Jun. 20, 2008.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(52) U.S. Cl.
USPC ................................................. 726/22

(58) Field of Classification Search
USPC ................................................. 726/22
See application file for complete search history.

(56) References Cited

U.S. PATENT DOCUMENTS

| | | | |
|---|---|---|---|
| 2007/0118669 A1 | 5/2007 | Rand et al. | |
| 2007/0204341 A1* | 8/2007 | Rand et al. | 726/22 |
| 2008/0028463 A1 | 1/2008 | Dagon et al. | |
| 2008/0080518 A1* | 4/2008 | Hoeflin et al. | 370/395.42 |
| 2008/0189409 A1* | 8/2008 | Pitkow et al. | 709/224 |

OTHER PUBLICATIONS

Know Your Enemy: Fast-Flux Service Networks William Salusky Robert Danford Jul. 13, 2007.*
Brooks, "BOTNETS, A threat to national security. (An examination of bots, botnets and the threats they pose to national security)"0 A Thesis submitted to the Department of Computer Science in partial fulfillment of the requirements for the degree of Masters of Science, Florida State University, Degree Awarded Spring Semester, 2008, retrieved on [Jul. 20, 2009], retrieved from <" http://etd.lib.fsu.edu/theses/available/etd-04142008-160116/unrestricted/BrooksLThesis.pdf">, 40 pages total.
International Search Report and Written Opinion of PCT Application No. PCT/US09/47849, mailed Jul. 27, 2009, 8 pages total.
Bambenek, J, "Double Flux Defense in the DNS Protocol," Network Working Group, University of Illinois, May 21, 2008.
Gasster, Liz, "GNSO Issues Report on Fast Flux Hosting," Issue Report on Fast Flux Hosting, Mar. 31, 2008.
Holz, Thorsten, et al, "Detection and Mitigation of Fast-Flux Service Networks," NDSS Symposium 2008, Feb. 12, 2008.

(Continued)

*Primary Examiner* — Kambiz Zand
*Assistant Examiner* — Benjamin Kaplan
(74) *Attorney, Agent, or Firm* — MH2 Technology Law Group, LLP (57) ABSTRACT

A system and method is disclosed herein for detecting fast flux networks. In one embodiment, the method comprises querying a domain name system (DNS) for DNS records associated with a domain. The method further comprises determining whether the domain name is part of a fast flux network of computers from results of the query. The method may further comprise determining the type of fast flux network as one of a single flux network, a double flux network, a top-tier flux network, or a lower-tier flux network.

22 Claims, 10 Drawing Sheets

(56) References Cited

OTHER PUBLICATIONS

Sauver, Joe St, "Per-ASN DNS Blackhole Lists: Latest Boon to System Administrators," http://cc.uoregon.edu/cnews/summer2003/perasn.html, accessed Feb. 26, 2009.

"Attackers Hide in Fast Flux," Dark Reading News Analysis, published Jul. 17, 2007.
"Know Your Enemy: Fast-Flux Service Networks," The Honeynet Project & Research Alliance, Last Modified: Jul. 13, 2007.

* cited by examiner

|  |  | Root NS A Subnet Count | NS A Subnet Count | Domain A Subnet Count | SOA Count |
|---|---|---|---|---|---|
|  |  | Number of unique class C subnets found in root NS A records. | Number of unique class C subnets found in NS A records according to authoritative servers. | Number of class C subnets found in Domain A records to authoritative servers. | Number of unique SOA records for the domain according to the authoritative servers. |
| Double Flux | Top Flux | 16 unique entries in 24 hrs. |  |  |  |
| Double Flux | Lower Flux |  | 16 unique entries in 24 hrs. | 10 unique entries in 24 hrs. | 10 unique entries in 24 hrs. |
|  | Single Flux |  |  | 10 unique entries in 24 hrs. |  |

Cells shaded are logical OR

FIGURE 6

```
Time,Domain,Source,Source File,Top,Lower,Double,Single,Root NS Count,Root NS A Count,Root NS A Subnets,NS Count,NS A
Count,NS A Subnets,Domain A Count,Domain A Subnets,SOA Count
2008-04-01 12:06:45,smufl.com.,rzu,20080401/20080401-59.rzu,false,true,4,12,10,0,0,18,18,1
2008-04-01 12:11:40,muven.com.,rzu,20080401/20080401-36.rzu,false,true,false,2,2,1,2,2,1,2,1,10
2008-04-01 12:11:40,pousadapedratora.com.,rzu,20080401/20080401-36.rzu,false,true,false,2,2,1,2,2,1,2,1,10
2008-04-01 12:11:40,pousadadecaldasnovas.com.,rzu,20080401/20080401-36.rzu,false,true,false,2,2,1,2,2,1,2,1,10
2008-04-01 12:11:41,prazeressexual.com.,rzu,20080401/20080401-36.rzu,false,true,false,2,2,1,2,2,1,2,1,10
2008-04-01 12:11:41,pousadasassociadas.com.,rzu,20080401/20080401-36.rzu,false,true,false,2,2,1,2,2,1,2,1,10
2008-04-01 12:11:41,powerclcanin.com.,rzu,20080401/20080401-36.rzu,false,true,false,2,2,1,2,2,1,2,1,10
2008-04-01 12:11:42,podmotor.com.,rzu,20080401/20080401-36.rzu,false,true,false,2,2,1,2,2,1,2,1,10
2008-04-01 12:11:42,prarieart.com.,rzu,20080401/20080401-36.rzu,false,true,false,2,2,1,2,2,1,2,1,10
2008-04-01 12:16:36,pousadaepesqueiromaeda.com.,rzu,20080401/20080401-37.rzu,false,true,false,2,2,1,2,2,1,2,1,10
2008-04-01 12:16:37,pousadadosbentvis.com.,rzu,20080401/20080401-37.rzu,false,true,false,2,2,1,2,2,1,2,1,10
2008-04-01 12:16:41,ctyostore.com.,rzu,20080401/20080401-49.rzu,false,true,true,8,9,2,0,0,10,10,2
2008-04-01 12:16:42,powerprana.com.,rzu,20080401/20080401-37.rzu,false,true,false,2,2,1,2,2,1,2,1,10
2008-04-01 12:16:42,powerpallets.com.,rzu,20080401/20080401-37.rzu,false,true,false,2,2,1,2,2,1,2,1,10
2008-04-01 12:16:44,ppositivo.com.,rzu,20080401/20080401-37.rzu,false,true,false,2,2,1,2,2,1,2,1,10
2008-04-01 12:16:45,pracol.com.,rzu,20080401/20080401-37.rzu,false,true,false,2,2,1,2,2,1,2,1,10
2008-04-01 12:41:44,bluepharminc.com.,rzu,20080401/20080401-89.rzu,false,true,false,4,4,4,20,20,0,0,1
2008-04-01 12:41:45,bluepharmaid.com.,rzu,20080401/20080401-89.rzu,false,true,true,4,4,4,20,20,20,20,1
2008-04-01 13:06:48,smufl.com.,rzu,20080401/20080401-59.rzu,false,true,false,4,16,14,0,0,19,19,1
```

FIGURE 7A

| Time | Domain | Source | Source File | Top | Lower | Double | Single | Root NS Count | Root NS A Count | Root NS A Subnets | Number of unique NS IPs according to the root servers | Number of unique class C subnets according to the root servers | NS Count | NS A Count | NS A Subnets | Number of unique class C subnets according to the authoritative servers | Domain A Count | Domain A Subnets | SOA Count |
|---|---|---|---|---|---|---|---|---|---|---|---|---|---|---|---|---|---|---|---|
| 4/1/08 12:06 | smuf.com | rzu | 20080401/20080401-59.rzu | FALSE | TRUE | FALSE | TRUE | 4 | 12 | 10 | 0 | 0 | 0 | 0 | 18 | 18 | 1 |
| 4/1/08 12:11 | mavcn.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | pousadapedratora.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | pousadadecaldasnovas.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | praevecosexual.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | pousedacasaoriadas.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | powerclaim.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | ppdmxtex.com | rzu | 20080401/20080401-36.rzu | FALSE | TRUE | FALSE | FALSE | 2 | 2 | 1 | 2 | 2 | 1 | 2 | 1 | 10 |
| 4/1/08 12:11 | prerleart.com | rzu | 20080401/20080401-36.rzu | FALSE | TRUE | FALSE | FALSE | 2 | 2 | 1 | 2 | 2 | 1 | 2 | 1 | 10 |
| 4/1/08 12:16 | pousadapequeiromaeda.com | rzu | 20080401/20080401-37.rzu | FALSE | TRUE | FALSE | FALSE | 2 | 2 | 1 | 2 | 2 | 1 | 2 | 1 | 10 |
| 4/1/08 12:16 | pousadadobankvis.com | rzu | 20080401/20080401-37.rzu | FALSE | TRUE | FALSE | FALSE | 2 | 2 | 1 | 2 | 2 | 1 | 2 | 1 | 10 |
| 4/1/08 12:16 | cryostere.com | rzu | 20080401/20080401-48.rzu | FALSE | TRUE | FALSE | TRUE | 8 | 9 | 9 | 0 | 0 | 0 | 10 | 10 | 2 |
| 4/1/08 12:16 | powerprana.com | rzu | 20080401/20080401-37.rzu | FALSE | TRUE | FALSE | FALSE | 2 | 2 | 1 | 2 | 2 | 1 | 2 | 1 | 10 |
| 4/1/08 12:16 | powerpaliets.com | rzu | 20080401/20080401-37.rzu | FALSE | TRUE | FALSE | FALSE | 2 | 2 | 1 | 2 | 2 | 1 | 2 | 1 | 10 |
| 4/1/08 12:16 | ppositiva.com | rzu | 20080401/20080401-37.rzu | FALSE | TRUE | FALSE | FALSE | 2 | 2 | 1 | 2 | 2 | 1 | 2 | 1 | 10 |
| 4/1/08 12:16 | pracol.com | rzu | 20080401/20080401-37.rzu | FALSE | TRUE | FALSE | FALSE | 2 | 2 | 1 | 2 | 2 | 1 | 2 | 1 | 10 |
| 4/1/08 12:41 | bluepharmrlC.com | rzu | 20080401/20080401-89.rzu | FALSE | TRUE | FALSE | TRUE | 4 | 4 | 4 | 20 | 20 | 20 | 2 | 0 | 10 |
| 4/1/08 12:41 | bluepharmaid.com | rzu | 20080401/20080401-89.rzu | FALSE | TRUE | FALSE | TRUE | 4 | 4 | 4 | 20 | 20 | 20 | 2 | 20 | 20 |
| 4/1/08 13:06 | smuf.com | rzu | 20080401/20080401-59.rzu | FALSE | TRUE | FALSE | TRUE | 4 | 16 | 14 | 0 | 0 | 0 | 19 | 19 | 1 |

FIGURE 7B

Fluxing Domains

- View Logs
- Test Domain: meds-ebay.com    Test for Fast Flux

Load Domain File

This option enables you to load a set of domains into the system to be analyzed and reported to the standard report file. The file format is:
domaina.com<CR>
domainb.com<CR>
etc.

Enter filename here    Load File

Upper Tier Detection Thresholds

Log domains with more than 0    unique root NS entries.
Log domains with more than 0    unique root NS A entries.
Log domains with more than 16   class C subnets found in root NS A records.

Lower Tier Detection Thresholds

Log domains with more than 0    unique NS entries (auth servers).
Log domains with more than 0    unique NS A entries (auth servers).
Log domains with more than 16   class C subnets found in NS A records (auth servers).
Log domains with more than 0    unique Domain A entries (auth servers).
Log domains with more than 10   class C subnets found in Domain A records (auth servers).
Log domains with more than 10   unique SOA entries (auth servers).

Save Thresholds

SYSTEM AND METHOD FOR FAST FLUX DETECTION

RELATED APPLICATION

The present invention claims priority to U.S. Provisional Patent Application No. 61/074,588 filed Jun. 20, 2008, and incorporates that application by reference.

FIELD OF THE INVENTION

The present invention relates to the field of computer security over the internet; more particularly, the present invention relates to detection of fast flux networks.

BACKGROUND OF THE INVENTION

The Internet is a worldwide publicly accessible computer network that consists of millions of smaller networks. Academic, business, government, etc. networks interconnect to transmit data between computers connected to the Internet. With the growth in popularity and usage of the Internet, crime has also grown with and adapted to the Internet environment. Criminal activity is also becoming more sophisticated to aid cyber criminals in evading detection.

One technique used in cyber crime is the creation and use of botnets, a network of infected computers that can be used as a platform for spreading infection to further systems. However, as detection systems became more sophisticated, simple botnets were replaced by fast flux networks. A fast flux network consists of a network of infected or compromised computer systems that constantly flux in and out of existence to create a resilient virtual network that is difficult to identify or take down. The fast fluxing computers that make up the network act as proxy systems to serve content from the flux-herder mothership.

The hosts comprising the fast flux network, or the mothership, if one exists, generally serves content for a valid domain name (i.e. http://www.fluxexample.com/), which is assigned multiple internet protocol (IP) addresses. Because domain name system (DNS) resource records can be changed every few minutes, the IP addresses of infected computer systems are swapped in and out of existence as often as every few minutes. Thus, each time a resource is requested from www-.fluxexample.com, the domain name will resolve at the IP address of a different infected computer. This flux may be accomplished by providing a short time to live (TTL) and a round-robin IP address assignment scheme for the DNS resource records. Within the veil of a protective and ever changing fast flux network, the hosts serving content may then run online pharmacy websites, money mule recruitment websites, phishing websites, illegal adult content websites, malware delivery websites, etc.

SUMMARY OF THE INVENTION

A system and method is disclosed herein for detecting fast flux networks. The method comprises querying a domain name system (DNS) for DNS records associated with a domain. The method further comprises determining whether the domain name is part of a fast flux network of computers based on the results of the queries. The method may further comprise determining the type of fast flux network as one of a single flux network, a double flux network, a top-tier flux network, or a lower-tier flux network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7A is an exemplary fast flux network report file.

DETAILED DESCRIPTION

A method and apparatus is disclosed herein for detecting fast flux networks. In one embodiment a method includes querying domain name system (DNS) records associated with a domain, and determining whether the domain name is part of a fast flux network from results of one or more queries. The DNS record queries are used to record unique instances of IP addresses, name servers, subnets, web servers, etc. associated with the domain. When the number or properties of unique entries associated with a DNS record exceeds a threshold or demonstrates certain properties, the network can be classified as a fast flux network.

In one embodiment, the fast flux network is identified as a single flux network, double flux network, top-tier flux network, or lower-tier flux network based on DNS record queries. The domain and type of flux network may then be logged for the domains identified as part of a fast flux network.

In one embodiment, suspect domains are received as data feeds, such as VeriSign® Domain Name Zone Alert (DNZA) data feeds, feeds of blacklisted domains, feeds of domains derived from spam lists/filters, etc. When the feed is received by a fast flux detection system, the receipt triggers DNS queries on the domains in the feed. If the suspect domain is confirmed as a fast flux network, this information in one embodiment, is provided to other services.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
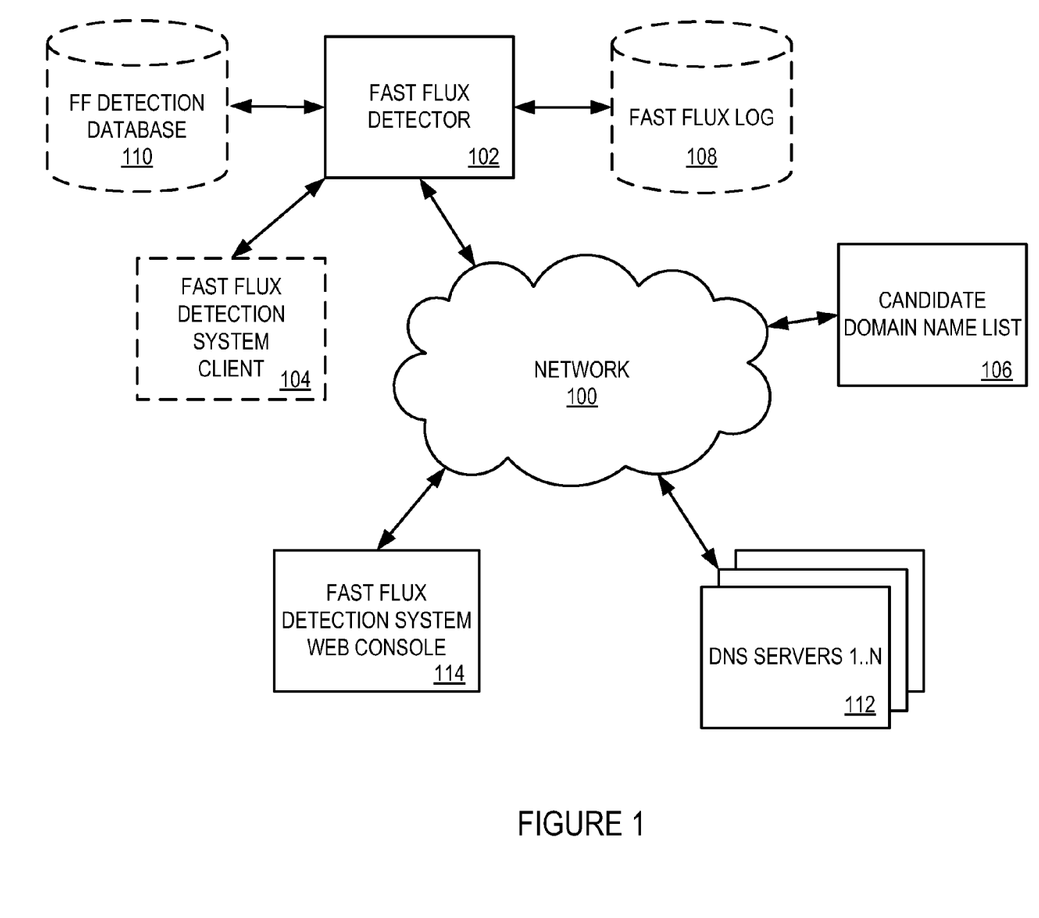
FIG. 1 is a network diagram of one embodiment of a network based fast flux detection system.

FIG. 1 is a network diagram of one embodiment of a network based fast flux detection system. For one embodiment, network 100 is an insecure network, such as the Internet.

In one embodiment, Fast Flux Detector 102 is coupled with Fast Flux (FF) Detection Database 110, Fast Flux Log 108, and Fast Flux Detection System Client 104. In one embodiment, FF Detection Database 110, Fast Flux Log 108, and Fast Flux Detection System Client 104 are internal components of Fast Flux Detector 102 (as indicated by the dashed line). In another embodiment, FF Detection Database 110, Fast Flux Log 108, and Fast Flux Detection System Client 104 are remote to Fast Flux Detector 102.

In one embodiment, Fast Flux Detector 102 is also coupled to Candidate Domain Name List 106 via network 100. As discussed in greater detail below, Fast Flux Detector 102 analyzes domains received from Candidate Domain Name List 106 to detect fast flux networks associated with those domains. In one embodiment, the domains may be received as input data feeds such as, for example, VeriSign® Domain Name Zone Alert (DNZA) data files, a list of domains that have been black listed, a list of domains derived from a spam feed, a list of domains suspected of being part of a fast flux network, an arbitrary list of domain names, etc. Domains may also be received at Fast Flux (FF) Detection System Client 104 from Fast Flux Detector System Web Console 114 as files of domain names, single domain names entered by a user of Fast Flux Detection System Web Console 114, etc. Various forms of input data may be received by Fast Flux Detector 102.

Fast Flux Detector 102 analyzes each domain in the input data for evidence of fast flux by performing DNS queries on DNS Servers 1 . . . N 112.

When Fast Flux Detector 102 performs a lookup on a domain name, one of DNS Servers 1 . . . N 112 is contacted to resolve the IP address for domain name by performing the lookup in a DNS server. For example, if a website name in the data feed is www.fastfluxexample.com, the DNS lookup obtains name server and web server data associated with the website, such as the mapping of the website to an internet protocol (IP) address, a domain name zone record, etc. In one embodiment, once a domain is identified as a potential fast flux network, DNS queries are run a preset number of times at intervals.

Fast Flux Detector 102 stores the results of the DNS queries in FF Detection Database 110. As Fast Flux Detector 102 runs additional DNS queries based on the input domain data feed, Fast Flux Detector 102 stores new data for the domain names with existing query records from previous lookups in FF Detection Database 110. The DNS queries may be run continuously, at a predetermined interval (such as every 5 minutes, or the frequency with which DNZA records are updated), randomly, periodically based on current available bandwidth, or at some other interval.

Fast Flux Detector 102 analyzes the data in FF Detection Database 110 to detect which domain names are part of fast flux networks. In one embodiment, Fast Flux Detector 102 determines the number of unique records it sees over a certain time period for each domain's IP addresses and name servers. If the number of unique entries reaches a threshold, Fast Flux Detector 102 flags that domain as a fluxing domain and logs the domain, flux type, and threshold numbers to Fast Flux (FF) Log 108.

In one embodiment, Fast Flux Detector 102 analyzes the data in FF Detection Database 110 for evidence of different types of fast flux networks based one or more configurable threshold values and time periods. Four examples of fast flux networks types detected by Fast Flux Detector 102 are:

"Single Flux" Networks—are those in which the DNS records associated with a target qualified domain name (QNAME) are changed.

"Double Flux" Networks—are those in which both the DNS records associated with a target QNAME and the name server (NS) records designating the name servers responsible for serving those records are changed.

"Top Tier Flux" Networks—are those in which records at the registrar level are changed—where the registrar is an entity with the ability to register domain names with the registry on behalf of third parties. That is, changing address (A) records for QNAMES registered as hosts with a registrar, or changing NS records for a second level domain. These changes are all visible in, for example, VeriSign® Domain Name Zone Alerts (DNZA).

"Lower Tier Flux" Networks—are those in which records on a privately managed or compromised DNS server are changed in such a way that it does not require or cause a notification to a registrar, and hence does not appear in DNZA.

In one embodiment, the number of unique subnets or autonomous system numbers ("ASNs") in which IP addresses occur is an incremental piece of intelligence used by Fast Flux Detector 102 to omit logging legitimate network changes, as discussed in more detail below.

In one embodiment, Fast Flux Detector 102 utilizes the detection results stored in FF Log 108 to generate alerts for domains that have been flagged as fast fluxing.

Fast Flux Detector 102 may also receive configuration data at Fast Flux (FF) Detection System Client 104 from Fast Flux Detector System Web Console 114. The configuration data may include customized fast flux thresholds, as discussed in greater detail below, for Fast Flux Detector 102 to utilize when analyzing domains. In one embodiment, the maximum rate at which DNS queries are sent by Fast Flux Detector 102 can be specified in the configuration data file.

Figure 2:
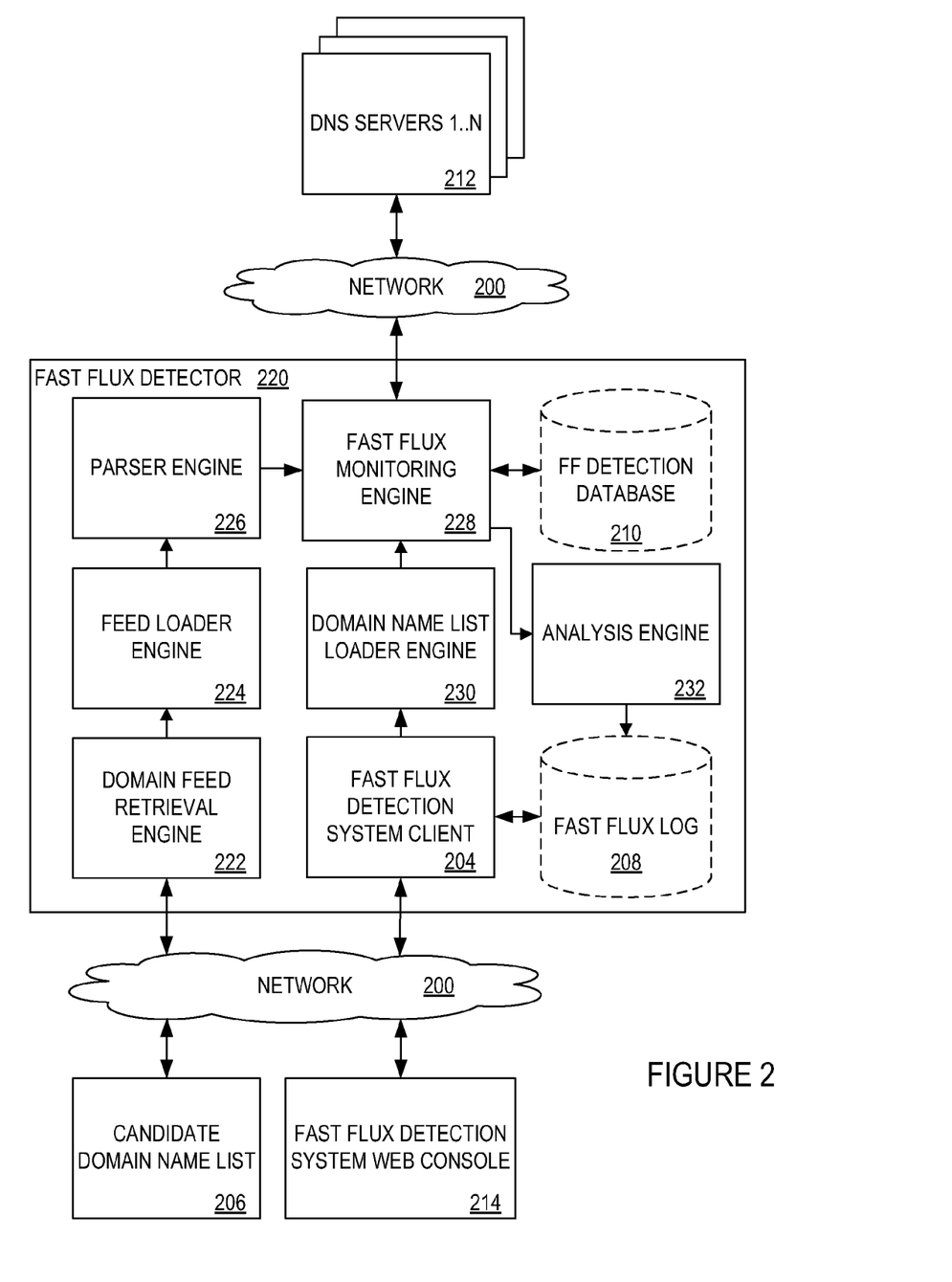
FIG. 2 is a block diagram of one embodiment of a fast flux detector.

FIG. 2 is a block diagram of one embodiment of a Fast Flux Detector 220. In one embodiment, Fast Flux Detector 220 is implemented as a cross platform application. In one embodiment, the cross platform application is a JAVA program running on a UNIX-based computer system. However, in other embodiments, different cross platform application environments and operating systems may be utilized to implement a Fast Flux Detector 220. The Fast Flux Detector 220 may also be implemented across multiple devices connected directly or via a network.

Domain Feed Retrieval Engine 222 obtains one or more domains to be monitored by the Fast Flux Detector 220. In one embodiment, Domain Feed Retrieval Engine 222 utilizes file transfer protocol (FTP) connection with access to Domain Name Zone Alert (DNZA) data from Candidate Domain Name List 206. However, other protocols may be used by Domain Feed Retrieval Engine 222. Furthermore, although the term "feed" is used here, the DNZA data may be received in a different format. The DNZA data includes data indicating domain names which have been registered for the first time. In one embodiment, the newly registered domains are analyzed by Fast Flux Detector 220 because many fast flux networks operate from newly created domain names before they are detected and/or shut down.

In one embodiment, Domain Feed Retrieval Engine 222 may also obtain domains, via an FTP connection to other remote servers, which provide files of blacklisted domains, domains collected by spam feeds, etc. However, any protocol may be utilized by Domain Feed Retrieval Engine 222 to obtain the list of domains.

The file of domains received by Domain Feed Loader Engine 222 instructs the Feed Loader Engine 224 to load the file into the Fast Flux Detector 220. Domain Feed Loader Engine 222 then passes the file to Parser Engine 226, which reads the file and extracts the list of domains to be analyzed by Fast Flux Detector 220. The list of domains is passed to Fast Flux Monitoring Engine 228.

In one embodiment, additional domain names to be evaluated are received by Fast Flux Detection System Client 204 and provided to Domain Name List Loader Engine 230. In one embodiment, Domain Name List Loader Engine 230 receives a pointer pointing to a file, which may be local or accessible via the network 200. In response to receiving the pointer, Domain Name List Loader Engine 230 reads the contents of the file and provides the contents to Fast Flux Monitoring Engine 228. In one embodiment, the file is received at Fast Flux Detection System Client 204 via a Java Server Page (JSP) provided to, and accessed by, a Fast Flux Detection System Web Console 214. In one embodiment, the file consists of a list of domains, with one domain per line of the file. Furthermore, instead of a file of domains, Domain Name List Loader Engine 230 may also receive a single domain at Fast Flux Detection System Client 204. The single domain name is also provided to Fast Flux Monitoring Engine 228. The domain data indicated in the file is utilized by Fast Flux Monitoring Engine 228 as discussed below.

In response to Fast Flux Monitoring Engine 228 receiving a list of domains, from either Parser Engine 226 or Domain Name List Loader Engine 230, Fast Flux Monitoring Engine 228 performs DNS lookups at one or more of DNS Servers 1 . . . N 212. In one embodiment, DNS lookups are performed for each domain in the list to obtain multiple records associated with a domain. In one embodiment, once Fast Flux Monitoring Engine 228 has completed its processing of the file, Fast Flux Monitoring Engine 228 deletes the domain list file.

In one embodiment, Fast Flux Monitoring Engine 228 queries top level domain (TLD) servers to get a list of name servers and their IP addresses, and queries one or more authoritative name servers for a domain to get information including NS records, address records for each NS record, the address record for the domain (if it exists), and the start of authority (SOA) record. Fast Flux Monitoring Engine 228 then inspects the records for basic soundness (i.e., do the authoritative name servers agree with each other, with the TLD servers, do the SOA records match, etc.).

After Fast Flux Monitoring Engine 228 performs a basic sanity check on the records, Fast Flux Monitoring Engine 228 adds the records to Fast Flux Detection Database 210. A basic sanity check ensures that the records are reasonable and do not contain elementary mistakes or impossibilities. In one embodiment, if the sanity check fails, the records are discarded and Fast Flux Monitoring Engine 228 performs new queries. In one embodiment, Fast Flux Detection Database 210 is an in-memory data storage system of Fast Flux Detector 220. In another embodiment, Fast Flux Detection Database 210 is a remote database (as indicated by the dashed line).

In one embodiment, the records are stored in ring buffers maintained at the Fast Flux Detection Database 210. The Ring Buffers hold various data over a period of time. Data in Fast Flux Detection Database 210 more than period T old is automatically deleted by Fast Flux Monitoring Engine 220. For a given key a set of unique values can be retrieved, and also for each value a time stamp can be retrieved. In one embodiment, the Database 210 is used to hold all the DNS Records for a domain, or in the case of the Parser Engine 226 the database holds a list of domains for a given name server.

In one embodiment, there several different ring buffers maintained by Fast Flux Monitoring Engine 228. Some of the ring buffers include:
DNZA
TLD NS Records
A records for the NS records returned from the TLD servers
NS records returned from authoritative NS servers
A records for the NS servers from the authoritative NS servers
SOA records from the authoritative NS servers for the domain
Address records for the domain returned from the authoritative NS servers.

In one embodiment, Fast Flux Monitoring Engine 228 performs continuous lookups for domains (i.e., successive requests after a DNS lookup has been completed, DNS lookups every five minutes, etc.). Fast Flux Monitoring Engine 228 updates existing records in Fast Flux Detection Database 210.

Since some fast flux occurs without changes to DNZA data or inclusion in an input domain file, in one embodiment, Fast Flux Monitoring Engine 228 "retries" DNS queries for domains seen previously in order to increase the detection rate.

Fast Flux Monitoring Engine 228 then provides the monitoring results (e.g., domains, records, changes, etc.) to Analysis Engine 232. Analysis Engine 232 tests the values against thresholds. When a value exceeds one or more thresholds, which indicates a likelihood that a domain associated with the value is part of a fast flux network, Analysis Engine 232 logs the domain in Fast Flux Log 208. In one embodiment, Fast Flux Log 208 is an in-memory data storage system of Fast Flux Detector 220. In another embodiment, Fast Flux Log 208 is a remote database or a file (as indicated by the dashed line).

In one embodiment, the threshold values are configurable and include one or more of the variables listed below in Table 1.

TABLE 1

| Variable | Description |
| --- | --- |
| maxTLDNS | The number of seen unique NS records (from the TLD server) detection threshold. |
| maxTLDNSA | The number of seen unique A records (for the NS records from the TLD server) detection threshold. |
| maxNS | The number of seen unique NS records (from the authoritative NS server) detection threshold. |
| maxNSA | The number of seen unique A records (for the NS records from the authoritative NS servers) detection threshold. |
| maxDomainA | The number of seen unique A records (for the domain from the authoritative NS servers) detection threshold. |
| maxSOA | The number of seen unique SOA records (for the domain from the authoritative NS servers) detection threshold. |
| maxTLDNSASubnet | The number of seen unique class C subnets (for the NS records from the authoritative NS servers) detection threshold. |
| maxNSASubnet | The number of unique class C subnets (for the domain from the authoritative NS servers) detection threshold. |
| maxNSASubnet | The number of unique class C subnets (for the NS records from the TLD servers) detection threshold. |

Figure 3:
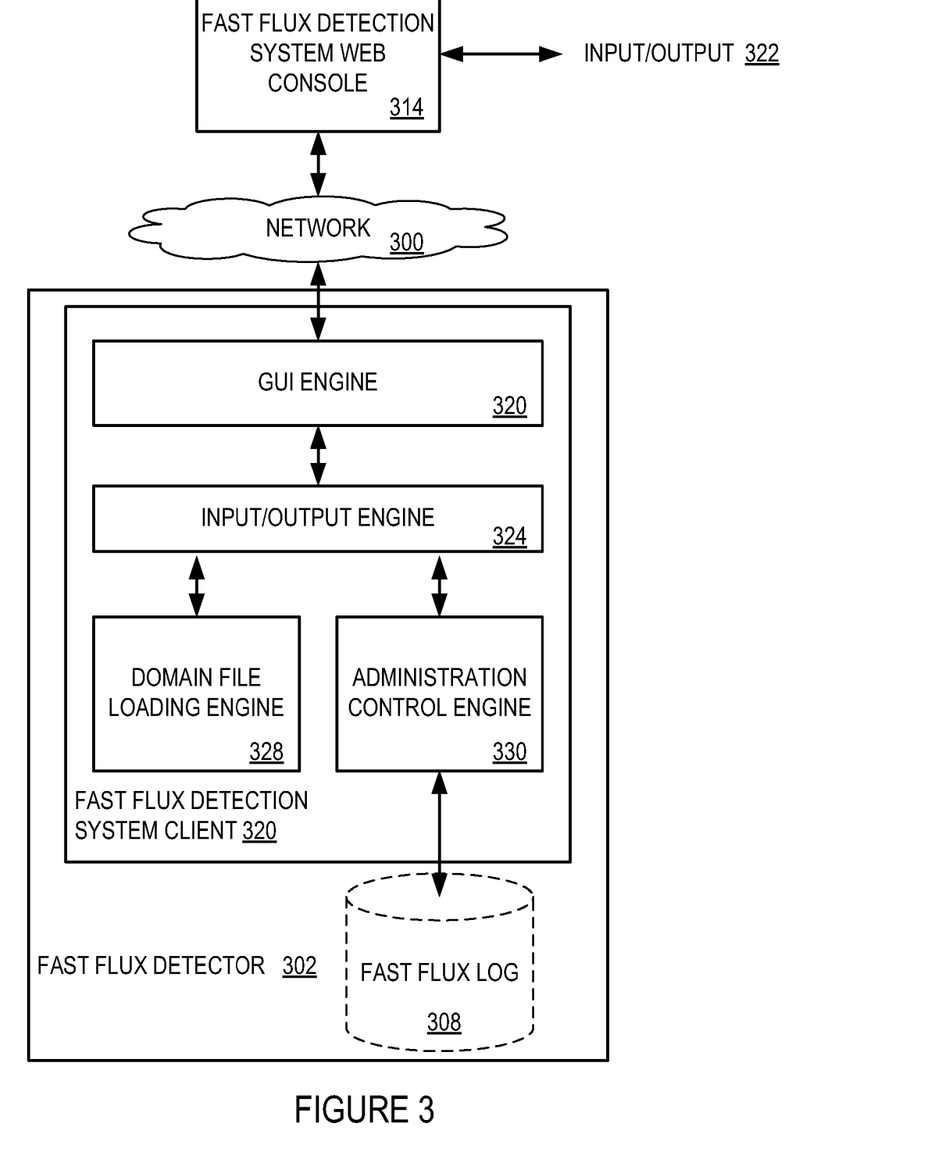
FIG. 3 is a block diagram of one embodiment of a fast flux detection system client.

FIG. 3 is a block diagram of one embodiment of a Fast Flux System Client 304. In one embodiment, the Fast Flux System Client 304 is implemented as a JSP page accessible to Fast Flux Detection System Web Console 314 over network 300 utilizing a standard hyper text transfer protocol (HTTP) interface. In one embodiment, Graphical User Interface (GUI) Engine 320 provides the JSP page to the Fast Flux Detection System Web Console 314.

Figure 8:
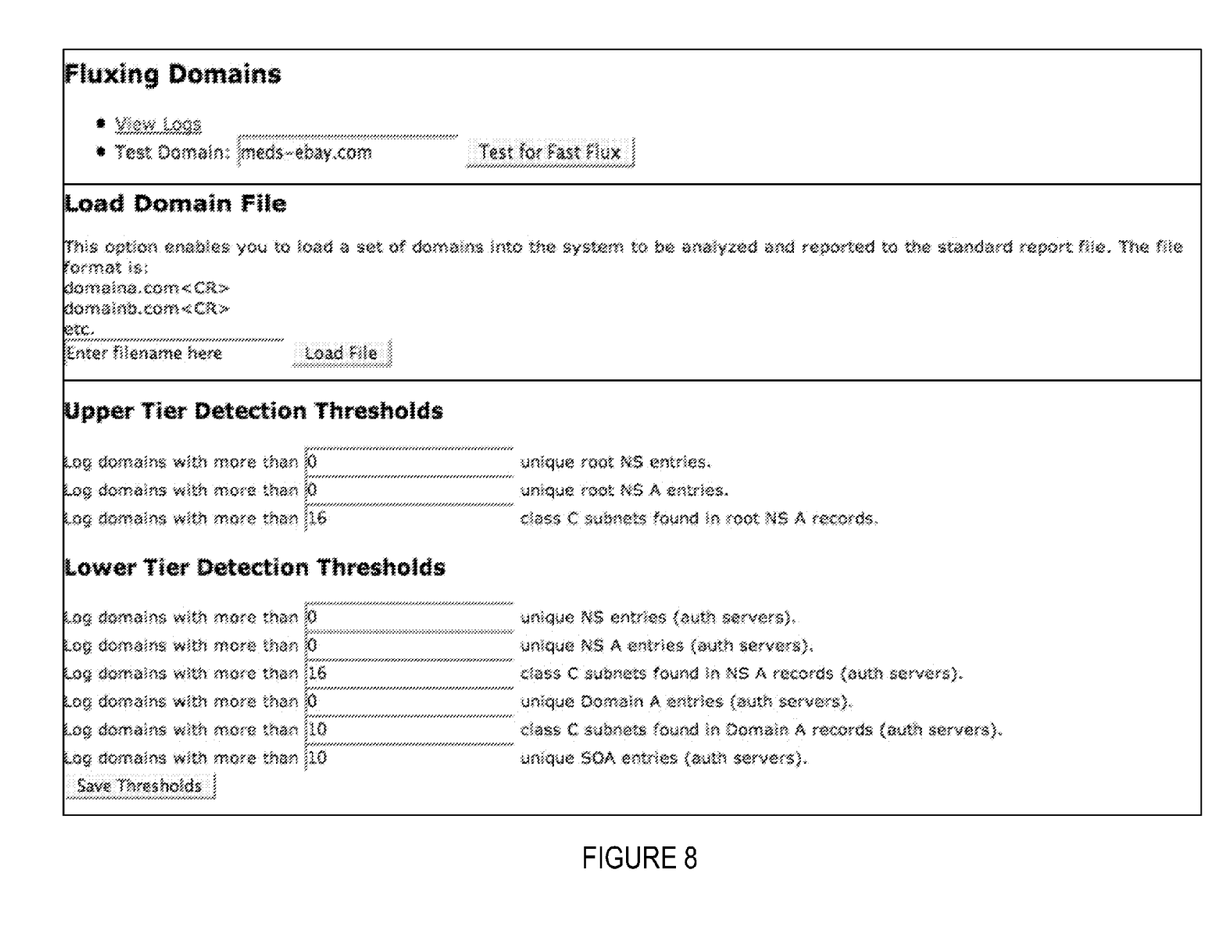
FIG. 8 illustrates one embodiment of a fast flux detection system client user interface.

In one embodiment, Input/Output Engine 324 receives user input 322 via GUI Engine 320. User input is data such as a domain name or a filename that the user has identified as being part of a fast flux network. In one embodiment, the user is a network administrator, or another authorized user. The input may be received via GUI Engine 320 that renders the Fast Flux Detection System Web Console 314 user interface front end of a Fast Flux Detection System. An exemplary GUI for fast flux detection as discussed herein is illustrated in FIG. 8.

The received domain name or filename is provided to Domain File Loading Engine 328. Where a filename is specified, Domain File Loading Engine 328 loads the file from the source specified in Input 322. Domain file Engine 328 then utilizes an FTP connection, or other protocol, to make the domain name or file contents available to Fast Flux Detector 302, as discussed above. In another embodiment, the data may be pushed to the Fast Flux Detector 302.

In one embodiment, GUI Engine 320 may provide a user interface that enables a user of Fast Flux Detection System Web Console 314 to modify the detection thresholds discussed above, and as illustrated in FIG. 8. In one embodiment, Fast Flux System Client 304 may also receive configuration data from Fast Flux Detection System Web Console 314 and provide the configuration data to Fast Flux Detector 302. The modified detection threshold values are provided to Administration Control Engine 330. Administration Control Engine 330 communicates the threshold values to Fast Flux Detector 302. In one embodiment, Administration Control Engine 330 communicates the values by instructing Fast Flux Detector 302 to update a configuration file.

In one embodiment Fast Flux Detection System Client 304 also receives commands to display data stored at Fast Flux Log 308 via the Administration Control Engine 330. When Administration Control Engine 330 detects input specifying a report generation received at Input/Output Engine 324, Administration Control Engine 330 composes a query to Fast Flux Log 308. The query is processed by iterating through the records stored in Fast Flux Log 308. The response received from Fast Flux Log 308 may then be displayed to a user on Fast Flux Detection System Web Console 314 via GUI Engine 320.

Figure 4:
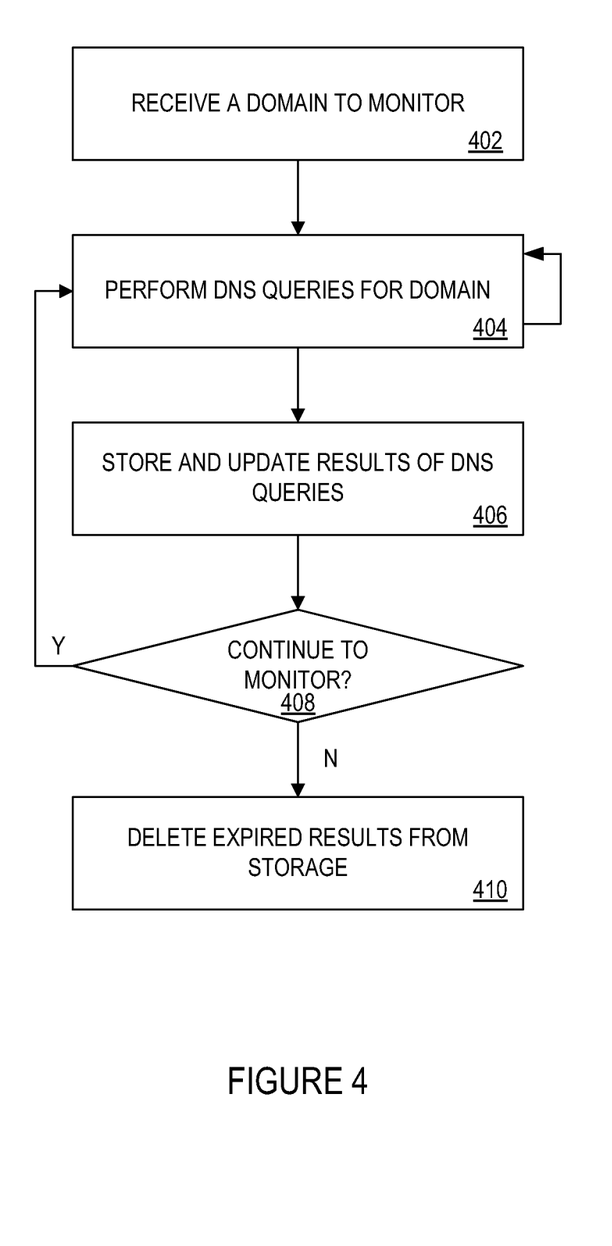
FIG. 4 is a flowchart of one embodiment for monitoring domain name system (DNS) records for fast flux network detection.

FIG. 4 is a flow diagram illustrating one embodiment of a method for monitoring DNS records for fast flux network detection. The process is performed by processing logic that may comprise hardware (circuitry, dedicated logic, etc.), software (such as is run on a general purpose computer system or a dedicated machine), or a combination of both. In one embodiment, the process is performed for each domain received.

The process starts at block 402 when processing logic receives a domain to monitor for fast flux characteristics (processing block 402). As discussed above, the domain may be received in the form of a list, a database, a file, or as a single domain address. In one embodiment, processing logic is configured to automatically retrieve Domain Name Zone Alert (DNZA) or other files. DNZA alert data is distributed by VeriSign® to propagate Domain Name System (DNS) updates to the top level domain (TLD) name zone files every few minutes. The updates provide data in virtually real time as to what is happening in .com and .net domain TLD zones.

Processing logic performs DNS queries for the received domain (processing block 404). In one embodiment, processing logic queries TLD DNS servers to obtain DNS data records. Such DNS data records include record types for DNZA, TLD NS Records, Address Records for the NS records returned from the TLD servers, NS Records returned from authoritative NS servers, Address Records for the NS servers from the authoritative NS servers, SOA Records from the authoritative NS servers for the domain, and Address Records for the domain returned from the authoritative NS servers. Other DNS records could also be queried by processing logic.

The results of the DNS queries are then stored by processing logic (processing block 406). In one embodiment, the results are stored in a database. The database may be a remote database. In one embodiment one or more in-memory ring buffers are utilized to store the DNS query results. The stored results are analyzed, as will be discussed in more detail below.

Processing logic then determines whether a time T for monitoring the received domain has elapsed or another property of the domain has expired (processing block 408). In one embodiment, an expired property indicates that the domain is no longer of interest, and monitoring the domain is no longer needed. When the time has not elapsed, processing logic returns to processing block 404 to perform new DNS queries for the received domain name. The stored results are then updated with the new query results (processing blocks 404 and 406). In one embodiment, processing logic monitors the number of unique entries over a certain time period for the domain's IP addresses, Class C Subnets, or ASNs they belong to, and name servers for the domain.

When the time has elapsed for monitoring the received domain name, processing logic continues to processing block 410. Processing logic deletes the DNS query results from storage after a storage time has been exceeded (processing block 410). In one embodiment, the default storage time is 24 hours, although any storage time may be utilized by processing logic for expiring DNS query results. In one embodiment, if the analysis shows that the domain may be part of a fast flux network, but is not necessarily conclusive, the storage time may be extended for that particular domain. In one embodiment, if the analysis is inconclusive, the DNS query results may be moved to another memory or storage location, for further analysis.

Figure 5:
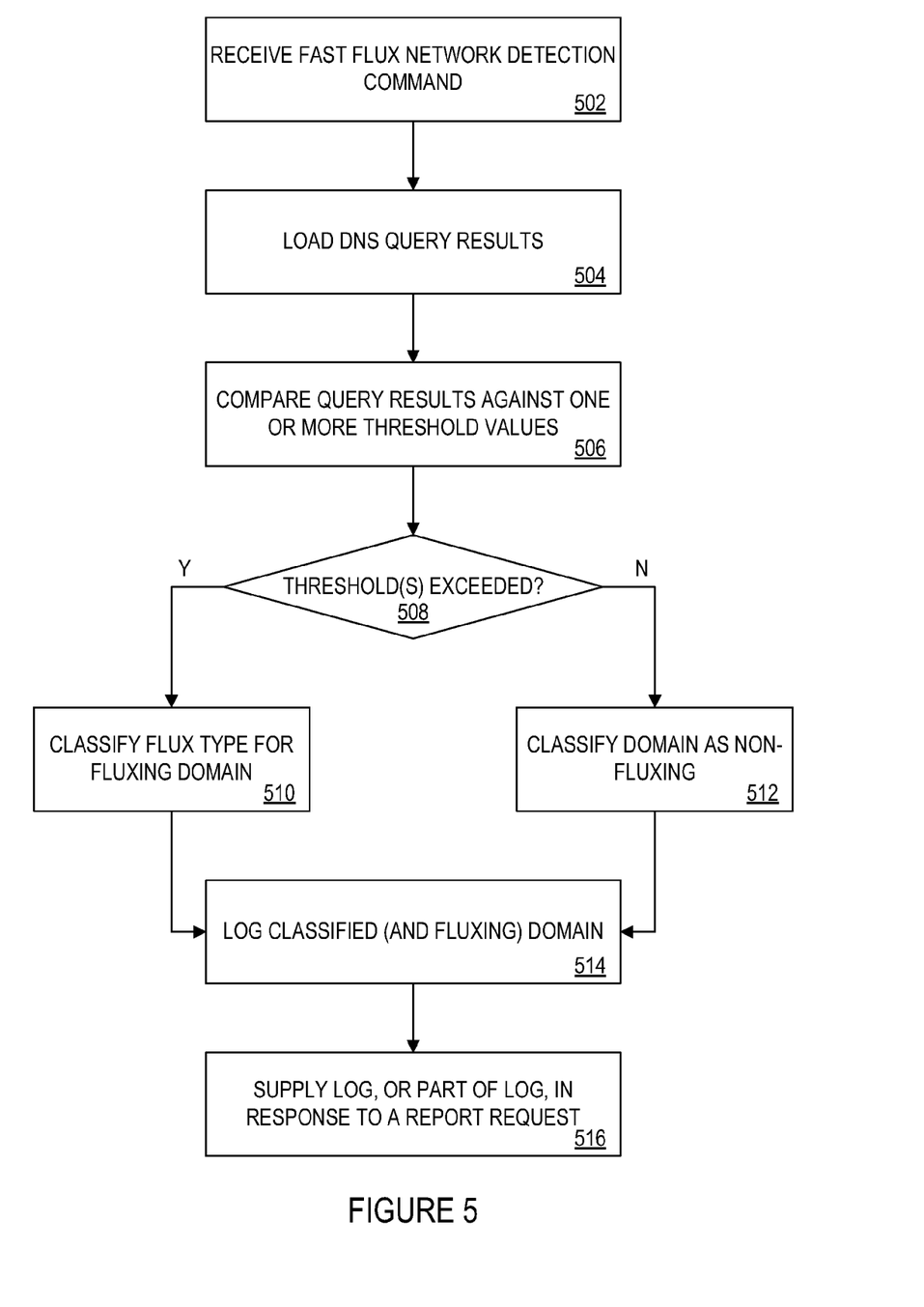
FIG. 5 is a flow diagram illustrating one embodiment of a method for analyzing DNS records for fast flux network detection.

FIG. 5 is a flow diagram illustrating one embodiment of a method for analyzing DNS records for fast flux network detection. The process is performed by processing logic that may comprise hardware (circuitry, dedicated logic, etc.), software (such as is run on a general purpose computer system or a dedicated machine), or a combination of both.

The process starts at block 502 when processing logic receives a fast flux network detection command (processing block 502). In one embodiment the command is received from a Fast Flux Detection System Client. In one embodiment fast flux network detection commands are issued periodically and automatically by processing logic so that fast flux network detection is performed in a continuous fashion. In one embodiment, fast flux network detection is automatically initiated for any domain where a domain is referenced in a transaction such as a DNS record change or inclusion in an email header or body.

In response to receiving the command(s), processing logic loads the DNS query results (processing block 504). In one embodiment, the DNS query results are loaded into an analysis engine of processing logic.

Processing logic compares the history or results of the DNS query analysis against one or more threshold values (processing block 506). In one embodiment, the default threshold values utilized by processing logic in the comparison are:

max_soa=10; This is especially useful with retries since it indicates that something in a domain is being changed at a fairly fast rate. It means that, for example, a sub domain changed.

max_TLD_ns_a_subnet=16; The number of unique class C subnets found in TLD NS Address records.

max_ns_a_subnet=16; The number of unique class C subnets found in NS Address records (auth servers).

max_domain_a_subnet=10; The number of class C subnets found in Domain Address records (auth servers).

Although the threshold values utilized by Analysis Engine are modifiable, the default values listed above were selected to both maximize the detection of malicious fast flux networks, while minimizing the erroneous logging of legitimate network changes (e.g., network changes due to load balancing, harmless IP reassignment, etc.). As discussed above, in one embodiment the threshold values are located in a configuration file accessible by processing logic. Thus, the threshold values may be modified based on user needs, system resources, detected trends, type of network flux to be detected, etc. In one embodiment, threshold values may be modified by domain, domain group, or other set of data.

Processing logic determines whether the domain exceeds one or more of the threshold values (processing block 508). If so, processing logic classifies the type of detected flux (processing block 510). As discussed above, flux type can be divided into at least four types as provided in Table 2.

TABLE 2

| Flux Type | DNS Record Values |
| --- | --- |
| Top Tier Flux | TLD ns a unique Class C subnets threshold reached. |
| Lower Tier Flux | ns a subnet, domain_a subnet or soa threshold reached. |
| Single Flux | domain_a subnet threshold is reached. |
| Double Flux | Top and Lower Tier Flux are true. |

If the domain does not exceed any of the threshold values, processing logic classifies it as "non-fluxing" (processing block 512).

Figure 6:
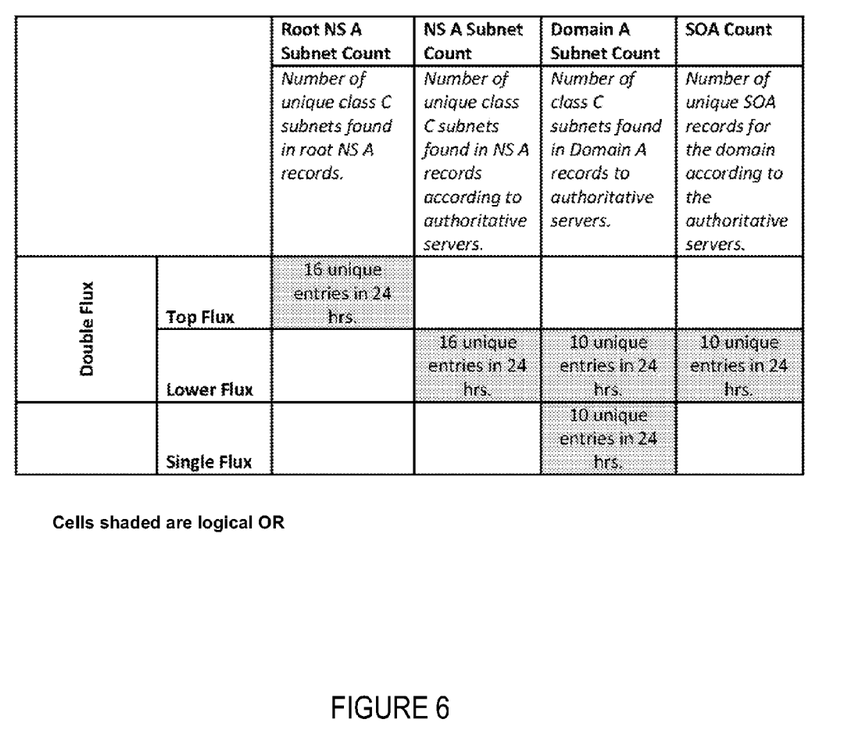
FIG. 6 is one embodiment of a decision table used in fast flux network type classification.

FIG. 6 illustrates one embodiment of a decision table utilized by processing logic to classify a fast flux network into one of the four flux types listed in Table 2. Note that although there are nine threshold values discussed above, processing logic may in one embodiment limit the threshold values used in fast flux detection to the four provided in FIG. 6 (i.e., TLD NS Address Subnet count, NS Address Subnet count, Domain Address Subnet count, and SOA count). Furthermore, the use of the four threshold values is designed to optimize the catch volume for malicious flux balanced against a minimum of false positives. The subnet thresholds reduce the number of false positives, i.e. they minimize entries in the detection logs of legitimate types of flux.

Returning to FIG. 5, in one embodiment, after processing logic classifies the flux type for a domain, if any, processing logic logs the domain (processing block 514). In one embodiment the domains are logged by appending a new line to a Fast Flux log file. In another embodiment, domains identified as fast flux networks are logged in a separate file. In one embodiment, the log consists of comma-separated fields for each record, including one or more of the following:

Date
Domain
Input source trigger: "Domain Name Zone Alert" (DNZA) or "domain" (Domain File) or "test" (Admin Control Query).
Input source file: DNZA or Domain File name, empty for test domains.
Top tier fast flux (true or false)
Lower tier fast flux (true or false)
Double flux (true or false)
Single flux (true or false)
Number of unique NS servers according to the TLD servers over the time period for its ring buffer.
Number of unique NS IP addresses according to the TLD servers over the time period for its ring buffer.
Number of unique class C subnets found in TLD NS A records.
Number of unique NS servers according to the authoritative servers over the time period for its ring buffer.
Number of unique NS IP addresses according to the authoritative servers over the time period for its ring buffer.
Number of unique class C subnets found in NS A records (auth servers).
Number of unique IP addresses for the domain according to the authoritative servers over the time period for its ring buffer.
Number of class C subnets found in Domain A records (auth servers).
Number of unique SOA records for the domain according to the authoritative servers over the time period for its ring buffer.
Log domains with more than unique SOA entries (auth servers).

An example report file, in one embodiment, is illustrated as a comma separated text file in FIG. 7A.

Figure 7B:
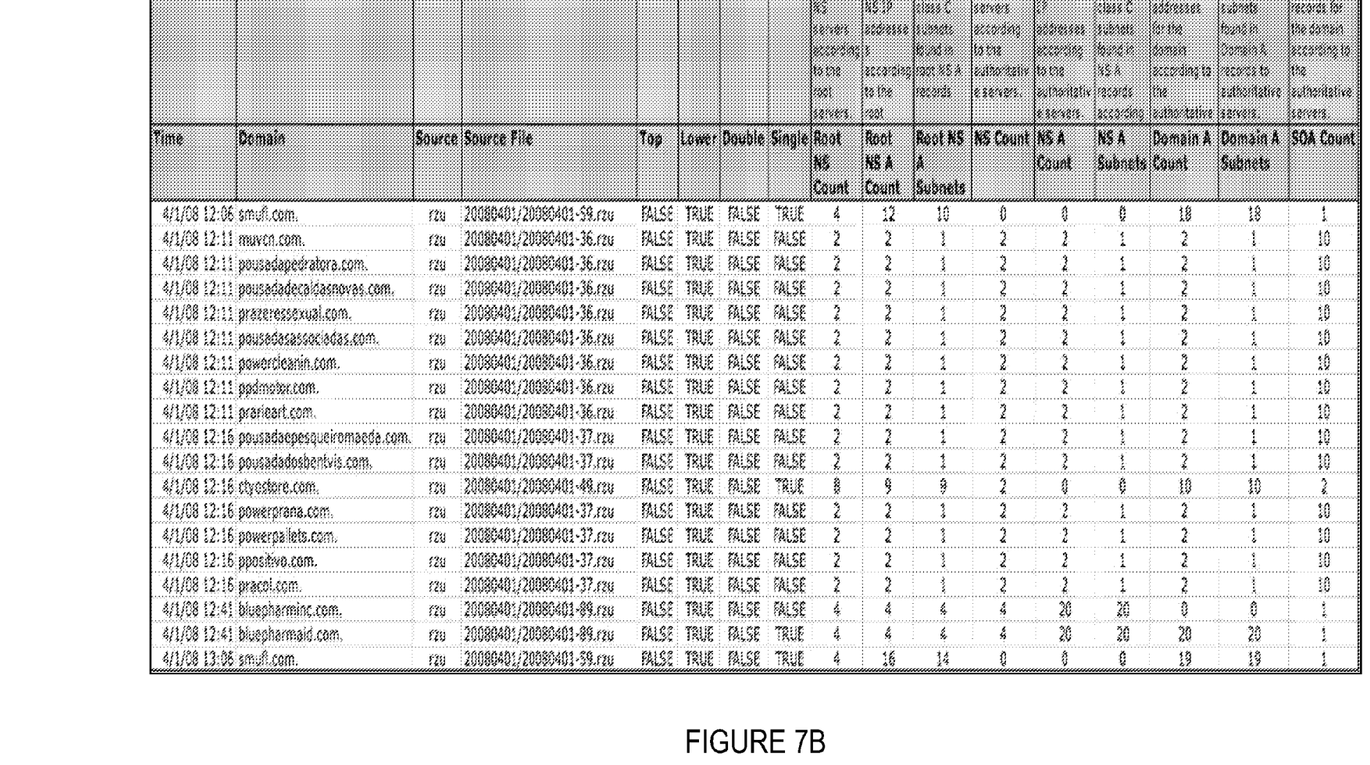
FIG. 7B illustrates the display of an exemplary fast flux network report in a spreadsheet.

Processing logic transmits the log or requested portions of the log to a requestor, in response to receiving a report request (processing block 512). In one embodiment, the report file may be provided to, and displayed by, a spreadsheet application, as illustrated in FIG. 7B.

Figure 9:
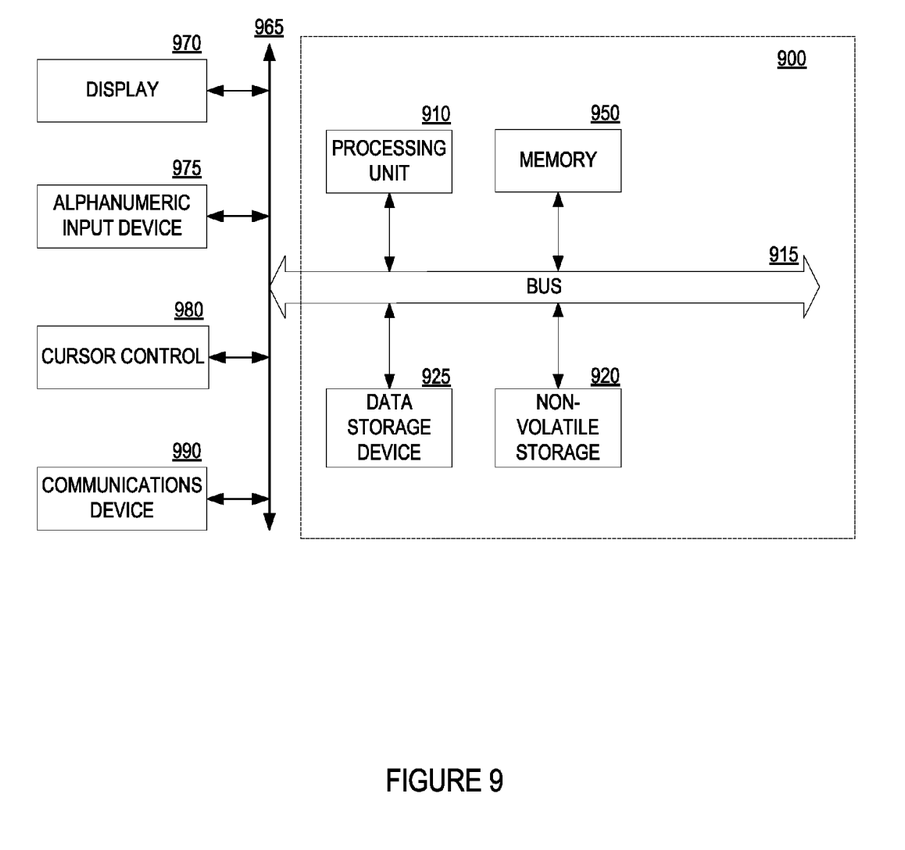
FIG. 9 is a block diagram of one embodiment of a computer system which may be used with the present invention.

FIG. 9 is one embodiment of a computer system on which the present invention may be implemented. It will be apparent to those of ordinary skill in the art, however, that other alternative systems of various system architectures may also be used.

The data processing system illustrated in FIG. 9 includes a bus or other internal communication means 965 for communicating information, and a processor 960 coupled to the bus 965 for processing information. The system further comprises a random access memory (RAM) or other volatile storage device 950 (referred to as memory), coupled to bus 965 for storing information and instructions to be executed by processor 960. Main memory 950 also may be used for storing temporary variables or other intermediate information during execution of instructions by processor 960. The system also comprises a read only memory (ROM) and/or static storage device 920 coupled to bus 965 for storing static information and instructions for processor 660, and a data storage device 925 such as a magnetic disk or optical disk and its corresponding disk drive. Data storage device 925 is coupled to bus 965 for storing information and instructions.

The system may further be coupled to a display device 970, such as a cathode ray tube (CRT) or a liquid crystal display (LCD) coupled to bus 965 through bus 965 for displaying information to a computer user. An alphanumeric input device 975, including alphanumeric and other keys, may also be coupled to bus 965 through bus 965 for communicating information and command selections to processor 960. An additional user input device is cursor control device 980, such as a mouse, a trackball, stylus, or cursor direction keys coupled to bus 965 through bus 965 for communicating direction information and command selections to processor 960, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 960.

It will be apparent to those of ordinary skill in the art that the system, method, and process described herein can be implemented as software stored in main memory 950 or read only memory 920 and executed by processor 960. This control logic or software may also be resident on an article of manufacture comprising a computer readable medium having computer readable program code embodied therein and being readable by the mass storage device 925 and for causing the processor 960 to operate in accordance with the methods and teachings herein.

The present invention may also be embodied in a handheld or portable device containing a subset of the computer hardware components described above. For example, the handheld device may be configured to contain only the bus 965, the processor 960, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 960, a data storage device 925, a bus 965, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 960. A computer-readable storage medium includes any mechanism for storing information in a form readable by a machine (e.g. a computer). For example, a computer-readable storage medium includes read-only memory (ROM), random access memory (RAM), magnetic disk storage media, optical storage media, flash memory devices, etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
   querying, over a period of time, a domain name system (DNS) for DNS records associated with a domain name;
   receiving, from the DNS over the period of time, the DNS records associated with the domain name;
   determining a number of unique parameters that are contained within the DNS records received from the DNS over the period of time;
   determining that the domain name is part of a fast flux network of computers based on the number of unique parameters; and
   identifying, based on the number of unique parameters, the fast flux network as one or more of: a single flux network, a double flux network, a top-tier flux network, and a lower-tier flux network.

2. The method of claim 1, further comprising:
   logging the domain name when the domain name is determined to be part of a fast flux network.

3. The method of claim 1, further comprising:
   receiving the domain name as a data feed; and
   initiating the querying in response to receiving the data feed.

4. The method of claim 3, wherein the data feed includes a plurality of domain names and DNS records associated with each domain name in the data feed are queried.

5. The method of claim 4, wherein the data feed is a file containing a list of domain names received from a client computer system.

6. The method of claim 5, wherein the data feed is one of a Domain Name Zone Alert (DNZA) data feed, a list of blacklisted domains, or a list of domains extracted from a spare list.

7. The method of claim 1,
   wherein the domain name is part of a fast flux network when the number of unique parameters over the period of time exceeds one or more thresholds.

8. The method of claim 7, wherein the unique parameters comprise internet protocol (IP) addresses and name servers.

9. The method of claim 7, wherein the domain name is identified as a double flux network when both a top tier flux network threshold and one of a plurality of lower tier flux network thresholds are reached.

10. The method of claim 9, wherein the top tier flux network threshold is based on a Top Level Domain (TLD) Name Server (NS) Address (A) Subnet count over the period of time, and the lower tier flux network thresholds are based on a NS A Subnet count over the period of time, a Domain A Subnet count over the period of time, and a start of authority (SOA) count over the period of time.

11. The method of claim 7, further comprising:
extending the period of time when a determination of whether the domain name is part of a fast flux network is not conclusive.

12. The method of claim 7, further comprising:
determining that the domain name is part of a legitimate network with when flux is detected, based on the number of unique parameters comprising at least one of a number of unique subuets and a number of autonomous system numbers (ASNs) in which intern et protocol (IP) addresses for the domain occur.

13. A system, comprising:
one or more memory devices storing instructions; and
one or more processors coupled to the one or more memory devices and configured to execute the instructions to perform a method comprising:
  querying, over a period of time, a domain name system (DNS) for DNS records associated with the domain name;
  receiving, from the DNS over the period of time, the DNS records associated with the domain name;
  determining a number of unique parameters that are contained within the DNS records received from the DNS over the period of time;
  determining that the domain name is part of a fast flux network of computers based on the number of unique parameters; and
  identifying, based on the number of unique parameters, the fast flux network as one or more of: a single flux network, a double flux network, a top-tier flux network, and a lower-tier flux network.

14. The system of claim 13,
wherein the domain name is part of a fast flux network when the number of unique parameters over the period of time exceeds one or more thresholds.

15. The system of claim 14,
wherein the domain name is identified as a double flux network when both a top tier flux network threshold and one of a plurality of lower tier flux network thresholds are reached.

16. The system of claim 14, wherein the one or more processors are configured to execute the instructions to perform the method further comprising:
generating a report indicating that the domain name is a fast flux network.

17. The system of claim 14, wherein the one or more processors are configured to execute the instructions to perform the method further comprising:
extending the period of time when determination of whether the domain name is part of a fast flux network is not conclusive.

18. The system of claim 14, wherein the one or more processors are configured to execute the instructions to perform the method further comprising:
determining the domain is part of a legitimate network, based on the number of unique parameters comprising at least one of a number of unique subnets and a number of autonomous system numbers (ASNs) in which internet protocol (IP) addresses for the domain occur.

19. The system of claim 13,
wherein the domain name is received as part of a data feed.

20. A non-transitory computer readable medium storing instructions thereon which, when executed by a system, cause the system to perform a method comprising:
  querying a domain name system (DNS) for DNS records associated with a domain name;
  receiving, from the DNS over the period of time, the DNS records associated with the domain name;
  determining a number of unique parameters that are contained within the DNS records received from the DNS over the period of time;
  determining that the domain name is part of a fast flux network of computers based on the number of unique parameters; and
  identifying, based on the number of unique parameters, the fast flux network as one or more of: a single flux network, a double flux network, a top-tier flux network, and a lower-tier flux network.

21. The non-transitory computer readable medium of claim 20,
Wherein the domain is part of a fast flux network when the number of unique parameters exceeds one or more thresholds.

22. The non-transitory computer readable medium of claim 20, the method further comprising:
receiving the domain name as a data feed.

* * * * *